United States Patent [19]
Rosen et al.

[11] Patent Number: 6,017,842
[45] Date of Patent: Jan. 25, 2000

[54] OLEFIN POLYMERIZATION CATALYST COMPOSITION COMPRISING GROUP 13 COMPOUND

[75] Inventors: Robert K. Rosen, Sugar Land; James C. Stevens, Richmond, both of Tex.

[73] Assignee: The Dow Chemical Company, Midland, Mich.

[21] Appl. No.: 08/896,897

[22] Filed: Jul. 18, 1997

Related U.S. Application Data

[60] Provisional application No. 60/022,061, Jul. 23, 1996.

[51] Int. Cl.$^7$ .................. C08F 4/44; C08F 4/02; B01J 31/00; B01J 37/00
[52] U.S. Cl. ............. 502/124; 502/103; 502/117; 502/128; 502/129; 502/132; 526/127; 526/160; 526/163; 526/943; 526/348.2
[58] Field of Search .................... 502/103, 124, 502/128, 129, 132, 117; 526/127, 160, 163, 943

[56] References Cited

U.S. PATENT DOCUMENTS

| | | | |
|---|---|---|---|
| 3,255,169 | 6/1966 | Kearby | 502/103 |
| 3,311,604 | 3/1967 | Marconi et al. | 526/163 |
| 3,386,975 | 6/1968 | Marconi et al. | 526/163 |
| 3,467,639 | 9/1969 | Marconi et al. | 502/103 |
| 3,468,867 | 9/1969 | Marconi et al. | 502/103 |
| 3,470,138 | 9/1969 | Marconi et al. | 502/103 |
| 3,476,734 | 11/1969 | Marconi et al. | 502/103 |
| 3,489,736 | 1/1970 | Takahaski et al. | 502/103 |
| 3,624,118 | 11/1971 | Papetti | 502/103 |
| 3,723,348 | 3/1973 | Apotheker et al. | 502/124 |
| 3,781,318 | 12/1973 | Corbellini et al. | 502/103 |
| 3,884,988 | 5/1975 | Girotti et al. | 502/103 |
| 3,904,692 | 9/1975 | Lassau et al. | 502/103 |
| 3,905,913 | 9/1975 | Corbellini et al. | 502/103 |
| 4,094,818 | 6/1978 | Langer, Jr. | 502/129 |
| 4,224,182 | 9/1980 | Langer, Jr. et al. | 526/163 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,096,867 | 3/1992 | Canich | 502/103 |
| 5,132,380 | 7/1992 | Stevens et al. | 526/126 |
| 5,296,433 | 3/1994 | Siedle et al. | 502/117 |
| 5,374,696 | 12/1994 | Rosen et al. | 526/126 |
| 5,453,410 | 9/1995 | Kolthammer et al. | 502/155 |
| 5,470,993 | 11/1995 | Devore et al. | 556/11 |
| 5,486,632 | 1/1996 | Devore et al. | 556/11 |
| 5,733,979 | 3/1998 | Costa et al. | 526/163 |

FOREIGN PATENT DOCUMENTS

| | | |
|---|---|---|
| 416815 | 3/1991 | European Pat. Off. . |
| 514828 | 11/1992 | European Pat. Off. . |
| 520732 | 12/1992 | European Pat. Off. . |

*Primary Examiner*—Mark L. Bell
*Assistant Examiner*—J. Pasterczyk

[57] ABSTRACT

Catalyst compositions that are highly tolerant of catalyst poisons comprising a catalytic derivative of a Group 4 metallocene metal complex and an Group 13 metal compound according to the formula $R^1{}_2M''(NR^2{}_2)$, wherein $R^1$ and $R^2$ independently each occurrence is a hydrocarbyl, silyl, halocarbyl, halohydrocarbyl, hydrocarbyl-substituted silyl, halocarbyl-substituted silyl, or halohydrocarbyl-substituted silyl group, said $R^1$ and $R^2$ having from 1 to 30 carbon, silicon, or mixtures of carbon and silicon atoms, and M" is a Group 13 metal, the molar ratio of complex to Group 13 compound being from 1:0.1 to 1:100.

8 Claims, No Drawings

OLEFIN POLYMERIZATION CATALYST COMPOSITION COMPRISING GROUP 13 COMPOUND

This application claims the benefit of U.S. Provisional Application No. 60/022,061 filed Jul. 23, 1996.

This invention relates to compositions of matter which are useful as addition polymerization catalysts, to a method for preparing these catalyst compositions and to a method of using these catalyst compositions. More particularly, this invention relates to improved olefin polymerization catalyst compositions comprising a Group 4 metal complex and a Group 13 amide or silylamide and to an improved method for polymerizing addition polymerizable monomers using the same.

Constrained geometry metal complexes, their preparation, methods of activation, active catalysts formed therefrom including cationic catalysts and methods of use are disclosed in EP-A-416,815; EP-A-514,828; EP-A-520,732; U.S. Pat. No. 5,064,802; U.S. Pat. No. 5,374,696; U.S. Pat. No. 5,470,993; U.S. Pat. No. 5,055,438, U.S. Pat. No. 5,057,475, U.S. Pat. No. 5,096,867, U.S Pat. No. 5,064,802, U.S. Pat. No. 5,132,380, and U.S. Pat. No. 5,453,410. For the teachings contained therein, the aforementioned United States patents and published European Patent Applications are herein incorporated in their entirety by reference thereto.

Although previously known active catalysts, especially the cationic catalysts disclosed in the foregoing applications and publications, have excellent activity, they are extremely sensitive to catalyst poisons, such as polar impurities, that may be contained in a polymerization mixture. Because of this fact, catalyst efficiencies and lifetimes have been limited and molecular weights of the resulting polymers have been reduced.

It is previously known in the art to utilize adjuvants such as trialkylboron and trialkylaluminum compounds to remove catalyst poisons from biscyclopentadienyl containing olefin polymerization catalysts. Disadvantageously however, such adjuvants have proven to be less effective in combating the inhibition of catalytically activated constrained geometry catalysts, and when used in the polymerization of olefin monomers, actually may interfere with the desired catalytic process. The previously disclosed U.S. Pat. No. 5,453,410 disclosed the combination of an alumoxane adjuvant with a cationic constrained geometry catalyst composition. However, alumoxanes are rather less soluble than is desired in aliphatic hydrocarbon solvents used in common polymerization systems. Additionally, alumoxanes are pyrophoric and are relatively expensive. Thus, it would be desirable to reduce the quantity of alumoxane used in a polymerization process or more desirably still, to eliminate use of alumoxanes entirely. Instead it would be desirable to utilize an adjuvant which is not pyrophoric and is more soluble in aliphatic hydrocarbons.

Finally, components in polymerization processes or their reaction products ultimately become incorporated into the polymer produced by the polymerization process unless a technique for their removal is available. Alumoxanes are relatively high molecular weight polymeric aluminum oxide compounds. Their presence in residual quantities in the polymerization product is generally not considered to be beneficial to polymer properties, and may actually degrade some polymer properties, particularly polymer clarity.

The present investigations have led to certain improved catalyst compositions that are highly active as addition polymerization catalysts, desirably having improved resistance to catalyst poisons, and improved efficiency.

According to the present invention there is now provided a catalyst composition comprising in combination:

a) a metal complex corresponding to the formula:
$C_{pI}MX_pL_q$,
that has been or subsequently is rendered catalytically active by combination with an activating cocatalyst or by use of an activating technique, wherein: M is a metal of Group 4 of the Periodic Table of the Elements having an oxidation state of +2, +3 or +4, bound in an $\eta^5$ bonding mode to one or more $C_p$ groups;

$C_p$ independently each occurrence is a cyclopentadienyl-, indenyl-, tetrahydroindenyl-, fluorenyl-, tetrahydrofluorenyl-, or octahydrofluorenyl-group optionally substituted with from 1 to 8 substituents independently selected from the group consisting of hydrocarbyl, halo, halohydrocarbyl, aminohydrocarbyl, hydrocarbyloxy, dihydrocarbylamino, dihydrocarbylphosphino, silyl, aminosilyl, hydrocarbyloxysilyl, and halosilyl groups containing up to 20 non-hydrogen atoms, or further optionally two such $C_p$ groups may be joined together by a divalent substituent selected from hydrocarbadiyl, halohydrocarbadiyl, hydrocarbyleneoxy, hydrocarbyleneamino, siladiyl, halosiladiyl, and divalent aminosilane, groups containing up to 20 non-hydrogen atoms;

X independently each occurrence is a monovalent anionic σ-bonded ligand group, a divalent anionic σ-bonded ligand group having both valences bonded to M, or a divalent anionic σ-bonded ligand group having one valency bonded to M and one valency bonded to a $C_p$ group, said X containing up to 60 nonhydrogen atoms;

L independently each occurrence is a neutral Lewis base ligating compound, having up to 20 atoms;

I is one or two;

p is 0, 1 or 2, and is I less than the formal oxidation state of M when X is an monovalent anionic σ-bonded ligand group or a divalent anionic σ-bonded ligand group having one valency bonded to M and one valency bonded to a $C_p$ group, or p is I+1 less than the formal oxidation state of M when X is a divalent anionic σ-bonded ligand group having both valencies bonded to M; and q is 0, 1 or 2; and b) a Group 13 compound according to the formula

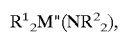

$R^1{}_2M''(NR^2{}_2)$, wherein $R^1$ and $R^2$ independently each occurrence is a hydrocarbyl, silyl, halocarbyl, halohydrocarbyl, hydrocarbyl-substituted silyl, halocarbyl-substituted silyl, or halohydrocarbyl-substituted silyl group, said $R^1$ and $R^2$ having from 1 to 30 carbon, silicon, or mixtures of carbon and silicon atoms, and M" is a Group 13 metal, the molar ratio of a):b) being from 1:0.1 to 1:100;

or the resulting derivative, reaction product or equilibrium mixture resulting from such combination.

Further according to the present invention there is provided a process for polymerization of addition polymerizable monomers or mixtures thereof comprising contacting said monomer or mixture of monomers with a catalyst system comprising the above catalyst composition under addition polymerization conditions. Preferred addition polymerizable monomers include $C_{2-20,000}$ α-olefins. Polymers prepared by the foregoing invented process are usefully employed for molding, film, sheet, extrusion foaming and other applications.

All references to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

The compositions of the present invention are believed to exist in the form of a mixture of one or more cationic, zwitterionic or other catalytically active species derived from the foregoing metal complex a) in combination with the Group 13 compound, b), or alternatively, a mixture of the metal complex or a cationic, zwitterionic or other catalytically active derivative thereof with a derivative formed by interaction of the Group 13 compound with the cocatalyst. Fully cationic or partially charge separated metal complexes, that is, zwitterionic metal complexes, have been previously disclosed in U.S. Pat. Nos. 5,470,993 and 5,486,632, the teachings of which are herein incorporated in their entirety by reference thereto. Derivatives of the Group 13 compound and cocatalyst may arise, for example, by ligand exchange, where the cocatalyst is a strong Lewis acid, such as tris(fluorophenyl)borane, some quantity of fluorophenyl substituents may exchange with the ligand groups of the Group 13 compound to form fluorophenyl substituted derivatives thereof.

The cationic complexes are believed to correspond to the formula: $C_{pI}M^+X_{p-1}A^-$ wherein:

M is a Group 4 in the +4 or +3 formal oxidation state;

$C_p$, X, I and p are as previously defined; and $A^-$ is a noncoordinating, compatible anion derived from the activating cocatalyst.

The zwitterionic complexes in particular result from activation of a Group 4 metal diene complex that is in the form of a metallocyclopentene, wherein the metal is in the +4 formal oxidation state, (that is X is 2-butene-1,4-diyl, or a hydrocarbyl substituted derivative thereof, having both valencies bonded to M) by the use of a Lewis acid activating cocatalyst, especially tris(perfluoroaryl)boranes. These zwitterionic complexes are believed to correspond to the formula: $C_{pI}M^+X_{p-1}L^{**}-A^-$ wherein:

M is a Group 4 metal in the +4 formal oxidation state;

$C_p$, X, I and p are as previously defined;

L** is the divalent remnant of the conjugated diene, X', formed by ring opening at one of the carbon to metal bonds of a metallocyclopentene; and $A^-$ is a noncoordinating, compatible anion derived from the activating cocatalyst.

As used herein, the recitation "noncoordinating" means an anion which either does not coordinate to component a) or which is only weakly coordinated therewith remaining sufficiently labile to be displaced by a neutral Lewis base, including an α-olefin. A non-coordinating anion specifically refers to an anion which when functioning as a charge balancing anion in the catalyst system of this invention, does not transfer a fragment thereof to said cation thereby forming a neutral four coordinate metal complex and a neutral byproduct. "Compatible anions" are anions which are not degraded to neutrality when the initially formed complex decomposes and are noninterfering with desired subsequent polymerizations.

Preferred L groups are phosphines, especially trimethylphosphine, triethylphosphine, triphenylphosphine and bis(1,2-dimethylphosphino)ethane; $P(OR)_3$, wherein R is as previously defined; ethers, especially tetrahydrofuran; amines, especially pyridine, bipyridine, tetramethylethylenediamine (TMEDA), and triethylamine; olefins; and conjugated dienes having from 4 to 40 carbon atoms. Complexes including conjugated diene L groups include those wherein the metal is in the +2 formal oxidation state.

Examples of coordination complexes a) used according to the present invention include the foregoing species:

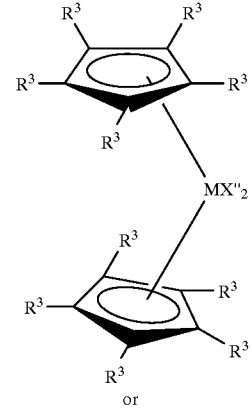

(I)

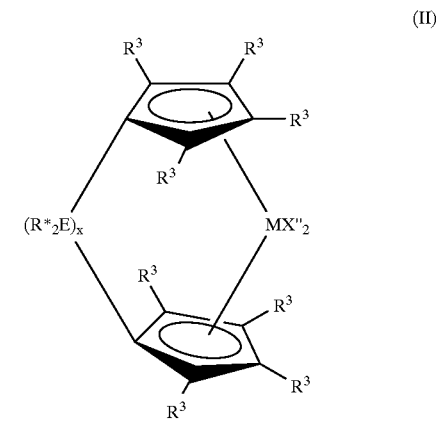

(II)

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (i.e., a hydrocarbadiyl, siladiyl or germadiyl group) thereby forming a fused ring system, X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a π-complex with M, whereupon M is in the +2 formal oxidation state, R* independently each occurrence is $C_{1-4}$ alkyl or phenyl, E independently each occurrence is carbon or silicon, and x is an integer from 1 to 8.

Additional examples of metal complexes a) include those corresponding to the formula: $C_pMX_pL_q$ (III) wherein $C_p$, M, X, L, p and q are as previously defined. A preferred metal complex belongs to the foregoing class (III) and corresponds to the formula:

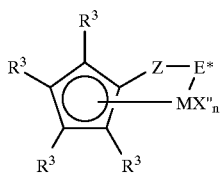

wherein:

M is titanium, zirconium or hafnium in the +2, +3 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (i.e., a hydrocarbadiyl, siladiyl or germadiyl group) thereby forming a fused ring system, each X" is a halo, hydrocarbyl, hydrocarbyloxy, hydrocarbylamino, or silyl group, said group having up to 20 non-hydrogen atoms, or two X" groups together form a neutral $C_{5-30}$ conjugated diene or a divalent derivative thereof;

$E^*$ is —O—, —S—, —NR*—, —PR*—;

Z is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein $R^*$ is as previously defined, and n is an integer from 1 to 3.

Most preferred coordination complexes a) used according to the present invention are complexes corresponding to the formula:

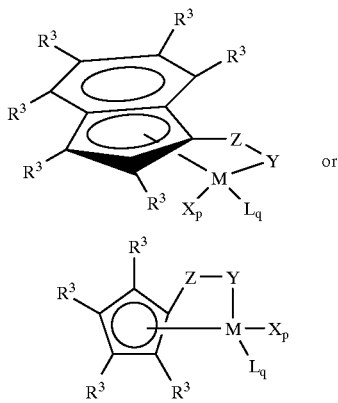

wherein:

$R^3$ independently each occurrence is a group selected from hydrogen, hydrocarbyl, halohydrocarbyl, silyl, germyl and mixtures thereof, said group containing up to 20 nonhydrogen atoms;

M is titanium, zirconium or hafnium;

Z, $E^*$, X and L are as previously defined;

p is 0, 1 or 2; and q is zero or one;

with the proviso that:

when p is 2, q is zero, M is in the +4 formal oxidation state, and X is an anionic ligand selected from the group consisting of halide, hydrocarbyl, hydrocarbyloxy, di(hydrocarbyl)amido, di(hydrocarbyl)phosphido, hydrocarbylsulfido, and silyl groups, as well as halo-, di(hydrocarbyl)amino-, hydrocarbyloxy- and di(hydrocarbyl)-phosphino-substituted derivatives thereof, said X group having up to 20 nonhydrogen atoms, when p is 1, q is zero, M is in the +3 formal oxidation state, and X is a stabilizing anionic ligand group selected from the group consisting of allyl, 2-(N,N-dimethylaminomethyl)phenyl, and 2-(N,N-dimethyl)-aminobenzyl, or M is in the +4 formal oxidation state, and X is a divalent derivative of a conjugated diene, M and X together forming a metallocyclopentene group, and when p is 0, q is 1, M is in the +2 formal oxidation state, and L is a neutral, conjugated or nonconjugated diene, optionally substituted with one or more hydrocarbyl groups, said L having up to 40 carbon atoms and forming a π-complex with M.

More preferred coordination complexes a) used according to the present invention are complexes corresponding to the formula:

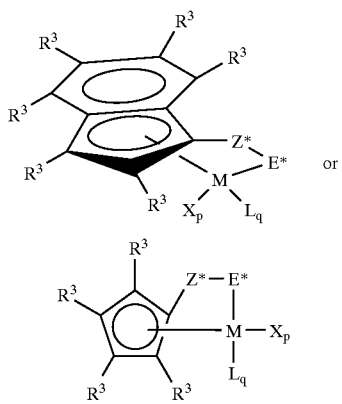

wherein:

$R^3$ independently each occurrence is hydrogen or $C_{1-6}$ alkyl;

M is titanium;

$E^*X$ is —O—, —S—, —NR*—, —PR*—;

$Z^*$ is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$;

$R^*$ each occurrence is independently hydrogen, or a member selected from hydrocarbyl, hydrocarbyloxy, silyl, halogenated alkyl, halogenated aryl, and combinations thereof, said $R^*$ having up to 20 non-hydrogen atoms, and optionally, two $R^*$ groups from Z (when $R^*$ is not hydrogen), or an $R^*$ group from Z and an $R^*$ group from $E^*$ form a ring system;

p is 0, 1 or 2;

q is zero or one;

with the proviso that:

when p is 2, q is zero, M is in the +4 formal oxidation state, and X is independently each occurrence methyl or benzyl, when p is 1, q is zero, M is in the +3 formal oxidation state, and X is 2-(N,N-dimethyl)aminobenzyl; or M is in the +4 formal oxidation state and X is 2-butene-1, 4-diyl, and when p is 0, q is 1, M is in the +2 formal oxidation state, and L is 1,4-diphenyl-1,3-butadiene or 1,3-pentadiene. The latter diene is illustrative of unsymetrical diene groups that result in production of metal complexes that are actually mixtures of the respective geometrical isomers.

The complexes can be prepared by use of well known synthetic techniques. A preferred process for preparing the metal complexes is disclosed in U.S. Ser. No. 8/427,378, filed Apr. 24, 1995, the teachings of which are hereby incorporated by reference. The reactions are conducted in a suitable noninterfering solvent at a temperature from −100 to 300° C., preferably from −78 to 100° C., most preferably from 0 to 50° C. A reducing agent may be used to cause the metal M, to be reduced from a higher to a lower oxidation state. Examples of suitable reducing agents are alkali metals, alkaline earth metals, aluminum and zinc, alloys of alkali metals or alkaline earth metals such as sodium/mercury amalgam and sodium/potassium alloy, sodium naphthalenide, potassium graphite, lithium alkyls, lithium or potassium alkadienyls, and Grignard reagents.

Suitable reaction media for the formation of the complexes include aliphatic and aromatic hydrocarbons, ethers, and cyclic ethers, particularly branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing are also suitable.

Suitable activating cocatalysts useful in combination with component a) are those compounds capable of abstraction of an X substituent therefrom to form an inert, noninterfering counter ion, or that form a zwitterionic or other catalytically active derivative of a). Suitable activating cocatalysts for use herein include perfluorinated tri(aryl)boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium- salts of compatible, noncoordinating anions, and ferrocenium salts of compatible, noncoordinating anions. Suitable activating techniques include the use of bulk electrolysis (explained in more detail hereinafter). A combination of the foregoing activating cocatalysts and techniques may be employed as well. The foregoing activating cocatalysts and activating techniques have been previously taught with respect to different metal complexes in the following references: EP-A-277,003, U.S. Pat. No. 5,153,157, U.S. Pat. No. 5,064,802, U.S. Pat. No. 5,321,106, EP-A-520,732; and U.S. Pat. No. 5,350,723, the teachings of which are hereby incorporated by reference.

More particularly, suitable ion forming compounds useful as cocatalysts in one embodiment of the present invention comprise a cation which is a Bronsted acid capable of donating a proton, and a compatible, noncoordinating anion, A− . As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitrites. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(L^*-H)^+_d(A)^{d-}$$

wherein:

L* is a neutral Lewis base;

(L*-H)+ is a Bronsted acid;

$A^{d-}$ is a noncoordinating, compatible anion having a charge of d-, and d is an integer from 1 to 3.

More preferably $A^{d-}$ corresponds to the formula: $[M'Q_4]^-$; wherein: 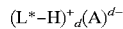

M' is boron or aluminum in the +3 formal oxidation state; and

Q independently each occurrence is selected from hydride, dialkylamido, halide, hydrocarbyl, hydrocarbyloxide, halosubstituted-hydrocarbyl, hydroxy-substituted hydrocarbyl, halosubstituted hydrocarbyloxy, and halo-substituted silylhydrocarbyl radicals (including perhalogenated hydrocarbyl- perhalogenated hydrocarbyloxy-and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433, the teachings of which are herein incorporated by reference.

In a more preferred embodiment, d is one, that is, the counter ion has a single negative charge and is A−. Activating cocatalysts comprising boron which are particularly useful in the preparation of catalysts of this invention may be represented by the following general formula: $(L^*-H)^+ (BQ_4)^-$; wherein:

L* is as previously defined;

B is boron in a formal oxidation state of 3; and

Q is a hydrocarbyl-, hydrocarbyloxy-, fluorinated hydrocarbyl-, fluorinated hydrocarbyloxy-, or fluorinated silylhydrocarbyl- group of up to 20 nonhydrogen atoms, with the proviso that in not more than one occasion is Q hydrocarbyl.

Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as:
trimethylammonium tetrakis(pentafluorophenyl) borate, triethylammonium tetrakis(pentafluorophenyl) borate,
tripropylammonium tetrakis(pentafluorophenyl) borate,
tri(n-butyl)ammonium tetrakis(pentafluorophenyl) borate,
tri(sec-butyl)ammonium tetrakis(pentafluorophenyl) borate,
N,N-dimethyl-N-dodecylammonium tetrakis (pentafluorophenyl) borate,
N,N-dimethyl-N-octadecylammonium tetrakis (pentafluorophenyl) borate,
N-methyl-N,N-didodecylammonium tetrakis (pentafluorophenyl) borate,
N-methyl-N,N-dioctadecylammonium tetrakis (pentafluorophenyl) borate,
N,N-dimethylanilinium tetrakis(pentafluorophenyl) borate,
N,N-dimethylanilinium n-butyltris(pentafluorophenyl) borate,
N,N-dimethylanilinium benzyltris(pentafluorophenyl) borate,
N,N-dimethylanilinium tetrakis(4-(t-butyldimethylsilyl)-2, 3, 5, 6-tetrafluorophenyl) borate,
N,N-dimethylanilinium tetrakis(4-(triisopropylsilyl)-2, 3, 5, 6-tetrafluorophenyl) borate,
N,N-dimethylanilinium pentafluorophenoxytris (pentafluorophenyl) borate,
N,N-diethylanilinium tetrakis(pentafluorophenyl) borate,
N,N-dimethyl-2,4,6-trimethylanilinium tetrakis (pentafluorophenyl) borate,
trimethylammonium tetrakis(2,3,4,6-tetrafluorophenyl) borate,
triethylammonium tetrakis(2,3,4,6-tetrafluorophenyl) borate,
tripropylammonium tetrakis(2,3,4,6-tetrafluorophenyl) borate,
tri(n-butyl)ammonium tetrakis(2,3,4,6-tetrafluorophenyl) borate,
dimethyl(t-butyl)ammonium tetrakis(2,3,4,6-tetrafluorophenyl) borate,
N,N-dimethylanilinium tetrakis(2,3,4,6-tetrafluorophenyl) borate,
N,N-diethylanilinium tetrakis(2,3,4,6-tetrafluorophenyl) borate, and
N,N-dimethyl-2,4,6-trimethylanilinium tetrakis(2,3,4,6-tetrafluorophenyl) borate;
disubstituted ammonium salts such as:
di-(i-propyl)ammonium tetrakis(pentafluorophenyl) borate, and
dicyclohexylammonium tetrakis(pentafluorophenyl) borate;
trisubstituted phosphonium salts such as:
ntriphenylphosphonium tetrakis(pentafluorophenyl) borate,
tri(o-tolyl)phosphonium tetrakis(pentafluorophenyl) borate, and
tri(2,6-dimethylphenyl)phosphonium tetrakis (pentafluorophenyl) borate;
disubstituted oxonium salts such as:
diphenyloxonium tetrakis(pentafluorophenyl) borate,
di(o-tolyl)oxonium tetrakis(pentafluorophenyl) borate, and
di(2,6-dimethylphenyl)oxonium tetrakis(pentafluorophenyl) borate;
disubstituted sulfonium salts such as:
diphenylsulfonium tetrakis(pentafluorophenyl) borate,
di(o-tolyl)sulfonium tetrakis(pentafluorophenyl) borate, and
bis(2,6-dimethylphenyl)sulfonium tetrakis (pentafluorophenyl) borate.

Preferred $(L^*-H)^+$ cations are N,N-dimethylanilinium, tributylammonium, N-methyl-N,N-di(dodecyl)ammonium, N-methyl-N,N-di(tetradecyl)ammonium, N-methyl-N,N-di(hexadecyl)ammonium, N-methyl-N,N-di(octadecyl) ammonium, and mixtures thereof. The latter three cations are the primary ammonium cations derived from a commercially available mixture of $C_{14-18}$ tallow amines, and are collectively referred to as bis-hydrogenated tallowalkyl methylammonium cation. The resulting ammonium salt of the tetrakis(pentafluorophenyl)borate anion accordingly is know as bis-hydrogenated tallowalkyl methylammonium tetrakis(pentafluorophenyl)borate.

Another suitable ion forming, activating cocatalyst comprises a salt of a cationic oxidizing agent and a noncoordinating, compatible anion represented by the formula:

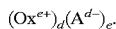

$(Ox^{e+})_d(A^{d-})_e.$ wherein:

$Ox^{e+}$ is a cationic oxidizing agent having a charge of e+;

e is an integer from 1 to 3; and $A^{d-}$ and d are as previously defined.

Examples of cationic oxidizing agents include: ferrocenium, hydrocarbyl-substituted ferrocenium, $Ag^+$ or $Pb^{+2}$. Preferred embodiments of $A^{d-}$ are those anions previously defined with respect to the Bronsted acid containing activating cocatalysts, especially tetrakis (pentafluorophenyl)borate.

Another suitable ion forming, activating cocatalyst comprises a compound which is a salt of a carbenium ion and a noncoordinating, compatible anion represented by the formula: ©⁺ A⁻ wherein:

©+ is a $C_{1-20}$ carbenium ion; and $A^{31}$ is as previously defined. A preferred carbenium ion is the trityl cation, i.e. triphenylmethylium.

A further suitable ion forming, activating cocatalyst comprises a compound which is a salt of a silylium ion and a noncoordinating, compatible anion represented by the formula:

$R'_3Si^+ A^-$ wherein:

R' is $C_{1-10}$ hydrocarbyl, and A⁻ are as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem. Comm.*, 1993, 383–384, as well as Lambert, J. B., et al., *Organometallics*, 1994, 13, 2430–2443. The use of the above silylium salts as activating cocatalysts for addition polymerization catalysts is claimed in U.S. Ser. No. 08/304,314, filed Sep. 12, 1994.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433, the teachings of which are herein incorporated by reference.

The technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are: liquids under the conditions of the electrolysis (generally temperatures from 0 to 100° C.), capable of dissolving the supporting electrolyte, and inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), dimethoxyethane (DME), and mixtures thereof.

The electrolysis may be conducted in a standard electrolytic cell containing an anode and cathode (also referred to as the working electrode and counter electrode respectively). Suitable materials of construction for the cell are glass, plastic, ceramic and glass coated metal. The electrodes are prepared from inert conductive materials, by which are meant conductive materials that are unaffected by the reaction mixture or reaction conditions. Platinum or palladium are preferred inert conductive materials. Normally an ion permeable membrane such as a fine glass frit separates the cell into separate compartments, the working electrode compartment and counter electrode compartment. The working electrode is immersed in a reaction medium comprising the metal complex to be activated, solvent, supporting electrolyte, and any other materials desired for moderating the electrolysis or stabilizing the resulting complex. The counter electrode is immersed in a mixture of the solvent and supporting electrolyte. The desired voltage may be determined by theoretical calculations or experimentally by sweeping the cell using a reference electrode such as a silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and a compatible, noncoordinating anion, $A^-$. Preferred supporting electrolytes are salts corresponding to the formula $G^+A^-$; wherein:

$G^+$ is a cation which is nonreactive towards the starting and resulting complex, and $A^-$ is as previously defined.

Examples of cations, $G^+$, include tetrahydrocarbyl substituted ammonium or phosphonium cations having up to 40 nonhydrogen atoms. Preferred cations are the tetra(n-butylammonium)-and tetraethylammonium-cations.

During activation of the complexes of the present invention by bulk electrolysis the cation of the supporting electrolyte passes to the counter electrode and $A^-$ migrates to the working electrode to become the anion of the resulting oxidized product. Either the solvent or the cation of the supporting electrolyte is reduced at the counter electrode in equal molar quantity with the amount of oxidized metal complex formed at the working electrode. Preferred supporting electrolytes are tetrahydrocarbylammonium salts of tetrakis(perfluoroaryl) borates having from 1 to 10 carbons in each hydrocarbyl or perfluoroaryl group, especially tetra(n-butylammonium)tetrakis(pentafluorophenyl) borate.

A further recently discovered electrochemical technique for generation of activating cocatalysts is the electrolysis of a disilane compound in the presence of a source of a noncoordinating compatible anion. All of the foregoing techniques are more fully disclosed and claimed in U.S. Pat. No. 5,372,682. In as much as the activation technique ultimately produces a cationic metal complex, the amount of such resulting complex formed during the process can be readily determined by measuring the quantity of energy used to form the activated complex in the process.

The most preferred activating cocatalysts are trispentafluorophenylborane and a mixture of long chain ammonium salts of tetrakis(pentafluorophenyl)borate, especially N,N-dioctadecyl-N-methylammonium tetrakpentafluorophenylborate and N,N-ditetradecyl-N-methylammonium tetrakpentafluorophenylborate. The latter mixture of borate salts is derived from hydrogenated tallow amine, and is referred to as bis-hydrogenated tallowalkyl methylammonium tetrakis(pentafluorophenyl)borate.

The molar ratio of metal complex: activating cocatalyst employed preferably ranges from 1:10 to 2:1, more preferably from 1:5 to 1.5:1, most preferably from 1:5 to 1:1.

The Group 13 component, component b) of the catalyst composition of the invention, preferably corresponds to the formula $R^1{}_2Al(NR^2{}_2)$ wherein $R^1$ and $R^2$, independently each occurrence are hydrocarbyl, halocarbyl, halohydrocarbyl, silyl, or hydrocarbyl-substituted silyl radicals of from 1 to 20 carbon, silicon or mixtures of carbon and silicon atoms, most preferably, methyl, ethyl, isopropyl, t-butyl, benzyl, 2,6-di(t-butyl)-4-methylphenyl, and pentafluorophenyl. Most highly preferred Group 13 compounds include: dimethylaluminum-N,N-dimethylamide, dimethylaluminum-N,N-diethylamide, dimethylaluminum-N,N-diisopropylylamide, dimethylaluminum-N,N-diisobutylamide, diethylaluminum-N,N-dimethylamide, diethylaluminum-N,N-diethylamide, diethylaluminum-N,N-diisopropylylamide, diethylaluminum-N,N-diisobutylamide, diisopropylaluminum-N,N-dimethylamide, diisopropylaluminum-N,N-diethylamide, diisopropylaluminum-N,N-diisopropylylamide, diisopropylaluminum-N,N-diisobutylamide, diisobytylaluminum-N,N-dimethylamide, diisobutylaluminum-N,N-diethylamide, diisobutylaluminum-N,N-diisopropylylamide, diisobutylaluminum-N,N-diisobutylamide, dimethylaluminum-N,N-bis(trimethylsilyl)amide, diethylaluminum-N,N-bis(trimethylsilyl)amide, diisobutylaluminum-N,N-bis(trimethylsilyl)amide, diisobutylaluminum-N,N-bis(trimethylsilyl)amide, and derivatives thereof formed by ligand exchange with fluorophenyl substituted borane compounds, especially pentafluorophenylborane.

The molar ratio of metal complex to component b) employed in the present invention preferably ranges from 1:1 to 1:100, more preferably from 1:1 to 1:20, most preferably from 1:1 to 1:10.

The process may be used to polymerize ethylenically unsaturated monomers having from 2 to 20 carbon atoms either alone or in combination. Preferred monomers include monovinylidene aromatic monomers, 4-vinylcyclohexene, vinylcyclohexane, norbornadiene and $C_{2-10}$ aliphatic α-olefins (especially ethylene, propylene, isobutylene, 1-butene, 1-hexene, 3-methyl-1-pentene, 4-methyl-1-pentene, and 1-octene), $C_{4-40}$ dienes, and mixtures thereof. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD). Most preferred monomers are ethylene, mixtures of ethylene, propylene and ethylidenenorbornene, or mixtures of ethylene and a $C_{4-8}$ α-olefin, especially 1-octene.

In general, the polymerization may be accomplished at conditions well known in the prior art for Ziegler-Natta or Kaminsky-Sinn type polymerization reactions, that is, temperatures from 0–250° C., preferably 30 to 200° C. and pressures from atmospheric to 30,000 atmospheres or higher. Suspension, solution, slurry, gas phase, solid state powder polymerization or other process condition may be employed if desired. A support, especially silica, alumina, or a polymer (especially poly(tetrafluoroethylene) or a polyolefin) may be employed, and desirably is employed when the catalysts are used in a gas phase polymerization process. The support is preferably employed in an amount to provide a weight ratio of catalyst (based on metal):support from 1:100,000 to 1:10, more preferably from 1:50,000 to 1:20, and most preferably from 1:10,000 to 1:30.

In most polymerization reactions the molar ratio of catalyst:polymerizable compounds employed is from $10^{-12}$:1 to $10^{-1}$:1, more preferably from $10^{-9}$:1 to $10^{-5}$:1.

Suitable solvents for polymerization are inert liquids. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes, and the like and aromatic and alkyl-substituted aromatic compounds such as benzene, toluene, xylene, ethylbenzene and the like. Suitable solvents also include liquid olefins which may act as monomers or comonomers including ethylene, propylene, butadiene, cyclopentene, 1-hexene, 1-hexane, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, vinyltoluene (including all isomers alone or in admixture), and the like. Mixtures of the foregoing are also suitable.

The catalysts may be utilized in combination with at least one additional homogeneous or heterogeneous polymerization catalyst in separate reactors connected in series or in parallel to prepare polymer blends having desirable properties.

Utilizing the catalyst compositions of the present invention copolymers having high comonomer incorporation and correspondingly low density, yet having a low melt index may be readily prepared. That is, high molecular weight polymers are readily attained by use of the present catalysts even at elevated reactor temperatures. This result is highly desirable because the molecular weight of α-olefin copolymers can be readily reduced by the use of hydrogen or similar chain transfer agent, however increasing the molecular weight of α-olefin copolymers is usually only attainable by reducing the polymerization temperature of the reactor. Disadvantageously, operation of a polymerization reactor at reduced temperatures significantly increases the cost of operation since heat must be removed from the reactor to maintain the reduced reaction temperature, while at the same time heat must be added to the reactor effluent to vaporize the solvent. In addition, productivity is increased due to improved polymer solubility, decreased solution viscosity, and a higher polymer concentration. Utilizing the present catalyst compositions, α-olefin homopolymers and copolymers having densities from 0.85 g/cm³ to 0.96 g/cm³, and melt flow rates from 0.001 to 10.0 dg/min are readily attained in a high temperature process.

The catalyst compositions of the present invention are particularly advantageous for the production of ethylene homopolymers and ethylene/α-olefin copolymers having high levels of long chain branching. The use of the catalyst compositions of the present invention in continuous polymerization processes, especially continuous solution polymerization processes, allows for elevated reactor temperatures which favor the formation of vinyl terminated polymer chains that may be incorporated into a growing polymer, thereby giving a long chain branch. The use of the present catalyst compositions advantageously allows for the economical production of ethylene/α-olefin copolymers having processability similar to high pressure, free radical produced low density polyethylene.

The present catalysts system may be advantageously employed to prepare olefin polymers having improved processing properties by polymerizing ethylene alone or ethylene/α-olefin mixtures with low levels of a "H" branch inducing diene, such as norbornadiene, 1,7-octadiene, or 1,9-decadiene. The unique combination of elevated reactor temperatures, high molecular weight (or low melt indices) at high reactor temperatures and high comonomer reactivity advantageously allows for the economical production of polymers having excellent physical properties and processability. Preferably such polymers comprise ethylene, a $C_{3-20}$ α-olefin and a "H"-branching comonomer. Preferably, such polymers are produced in a solution process, most preferably a continuous solution process.

As previously mentioned, the present catalyst composition is particularly useful in the preparation of EP and EPDM copolymers in high yield and productivity. The process employed may be either a solution or slurry process both of which are previously known in the art. Kaminsky, *J. Poly. Sci.*, Vol. 23, pp. 2151–64 (1985) reported the use of a soluble bis(cyclopentadienyl) zirconium dimethyl-alumoxane catalyst system for solution polymerization of EP and EPDM elastomers. U.S. Pat. No. 5,229,478 disclosed a slurry polymerization process utilizing similar bis (cyclopentadienyl) zirconium based catalyst systems.

The catalyst composition may be prepared as a homogeneous catalyst by addition of the requisite components to a solvent in which polymerization will be carried out by solution polymerization procedures. The catalyst system may also be prepared and employed as a heterogeneous catalyst by adsorbing the requisite components on a catalyst support material such as silica gel, alumina or other suitable inorganic support material. When prepared in heterogeneous or supported form, it is preferred to use silica as the support material. The heterogeneous form of the catalyst system is employed in a slurry polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably the diluent comprises in at least major part the α-olefin monomer or monomers to be polymerized.

In contrast, solution polymerization conditions utilize a solvent for the respective components of the reaction, particularly the EP or EPDM polymer. Preferred solvents include mineral oils and the various hydrocarbons which are liquid at reaction temperatures. Illustrative examples of useful solvents include alkanes such as pentane, iso-pentane, hexane, heptane, octane and nonane, as well as mixtures of alkanes including kerosene and Isopar E™, available from Exxon Chemicals Inc.; cycloalkanes such as cyclopentane and cyclohexane; and aromatics such as benzene, toluene, xylenes, ethylbenzene and diethylbenzene.

At all times, the individual ingredients as well as the recovered catalyst components must be protected from oxygen and moisture. Therefore, the catalyst components and catalysts must be prepared and recovered in an oxygen and moisture free atmosphere. Preferably, therefore, the reactions are performed in the presence of an dry, inert gas such as, for example, nitrogen.

Generally the polymerization process is carried out with a differential pressure of ethylene of from about 10 to about 1000 psi (70 to 7000 kPa), most preferably from about 40 to about 400 psi (30 to 300 kPa). The polymerization is generally conducted at a temperature of from 25 to 200° C., preferably from 75 to 170° C., and most preferably from greater than 95 to 160° C.

The polymerization may be carried out as a batchwise or a continuous polymerization process A continuous process is preferred, in which event catalyst, ethylene, α-olefin, and optionally solvent and diene are continuously supplied to the reaction zone and polymer product continuously removed therefrom.

The skilled artisan will appreciate that the invention disclosed herein may be practiced in the absence of any component which has not been specifically disclosed. The following examples are provided as further illustration of the invention and are not to be construed as limiting. Unless stated to the contrary all parts and percentages are expressed on a weight basis.

EXAMPLE 1

A stirred 3.8 liter reactor was charged with about 1440 g of Isopar-E™ mixed alkanes solvent (available from Exxon Chemicals Inc.) and about 130 g of 1-octene comonomer. Hydrogen (10 mMol) was added as a molecular weight control agent using a mass flow meter. The reactor was heated to the polymerization temperature of 130° C. and saturated with ethylene at 450 psig (3.1 MPa). Catalyst ((t-butylamido)dimethyl($\eta^5$-tetramethylcyclopenta-dienyl) silanetitanium (II) $\eta^4$-1,3-pentadiene (TI), or bis(n-butylcyclopentadienyl)-zirconium dimethyl (ZR)) and cocatalyst (trispentafluorophenylborane (FAB), bis-hydrogenated tallowalkyl methylammonium tetrakis (pentafluorophenyl)borate (BFA), or bis-hydrogenated tallowalkyl methylammonium hydroxyphenyltris(pentafluorophenyl)borate (BHI)) were dissolved in Isopar E™ and premixed in a drybox with diethylaluminum-N,N-diisopropylamide (DEA) or diisobutylaluminum-N,N-bis (trimethylsilyl)amide (DIB), and transferred to a catalyst addtion system and injected into the reactor over approximately 4 minutes using a flow of high pressure Isopar E™ solvent. The polymerization conditions were maintained for 10 minutes with ethylene supplied on demand to maintain 450 psig reactor pressure. The ethylene consumed during the reaction was monitored using a mass flow meter and this consumption was used to calculate the catalyst efficiency. Results are contained in Table 1.

What is claimed is:

1. A catalyst composition comprising in combination:

a) a metal complex corresponding to the formula: $C_{pI}MX_pL_q$ that has been or is rendered catalytically active by combination with an activating cocatalyst or by use of an activating technique, wherein: M is a metal of Group 4 of the Periodic Table of the Elements having an oxidation state of +2, +3 or +4, bound in an $\eta^5$ bonding mode to one or two $C_p$ groups;

$C_p$ independently each occurrence is a cyclopentadienyl-, indenyl-, tetrahydroindenyl-, fluorenyl-, tetrahydrofluorenyl-, or octahydrofluorenyl-group optionally substituted with from 1 to 8 substituents independently selected from the group consisting of hydrocarbyl, halo, halohydrocarbyl, aminohydrocarbyl, hydrocarbyloxy, dihydrocarbylamino, dihydrocarbylphosphino, silyl, aminosilyl, hydrocarbyloxysilyl, and halosilyl groups containing up to 20 non-hydrogen atoms, or further optionally two such $C_p$ groups may be joined together by a divalent substituent selected from the group consisting of hydrocarbadiyl, halohydrocarbadiyl, hydrocarbyleneoxy, hydrocarbyleneamino, siladiyl, halosiladiyl, and divalent aminosilane groups containing up to 20 non-hydrogen atoms;

X independently each occurrence is a monovalent anionic σ-bonded ligand group, a divalent anionic σ-bonded ligand group having both valences bonded to M, or a divalent anionic σ-bonded ligand group having one valency bonded to M and one valency bonded to a $C_p$ group, said X containing up to 60 nonhydrogen atoms;

independently each occurrence is a neutral Lewis base ligand having up to 20 atoms;

I is one or two;

p is 0, 1 or 2, and is I less than the formal oxidation state of M when X is an monovalent anionic σ-bonded ligand group or a divalent anionic σbonded ligand group having one valency bonded to M and one valency bonded to a $C_p$ group, or p is I +1 less than the formal oxidation state of M when X is a divalent anionic σ-bonded ligand group having both valencies bonded to M; and q is 0, 1 or 2; and b) a Group 13 compound according to the formula $R^1_2M''(NR^2_2)$, wherein $R^1$ and $R^2$ independently each occurrence is a hydrocarbyl, silyl, halocarbyl, halohydrocarbyl, hydrocarbyl-substituted silyl, halocarbyl-substituted silyl, or halohydrocarbyl-substituted silyl group, said

TABLE 1

| Run | Catalyst (μmol) | Cocatalyst | Scavenger | Ratio[1] M:B:Al | Solvent (g) | 1-octene (g) | Efficiency[2] Kg/g |
|---|---|---|---|---|---|---|---|
| 1 | TI (1.5) | FAB | DEA | 1:3:10 | 1437 | 123 | 1.2 |
| 2 | " | BFA | " | 1:1.5:10 | 1417 | 139 | 1.7 |
| 3 | " | " | DIB | 1:1:5 | 1451 | 131 | 2.4 |
| 4 | TI (1.0) | " | " | 1:1:10 | 1453 | 132 | 3.5 |
| 5 | TI (0.75) | " | " | 1:1:15 | 1434 | 128 | 4.3 |
| 6 | " | " | " | 1:1:30 | 1448 | 127 | 4.3 |
| 7 | TI (1.5) | BHI | " | 1:1:10 | 1455 | 122 | 1.0 |
| 8 | ZR (1.5) | BFA | DEA | 1:1.5:10 | 1409 | 126 | 2.1 |

[1]·molar ratio of metal complex:cocatalyst:scavenger
[2]·Kg of polymer per gram titanium or zirconium $R^1$ and $R^2$ each having from 1 to 30 carbon, silicon, or mixtures of carbon and silicon atoms, and M" is a Group 13 metal, the molar ratio of a):b) being from 1:0.1 to 1:100; or the resulting derivative, reaction product or equilibrium mixture resulting from such combination.

2. A catalyst composition according to claim 1 wherein the Group 13 compound corresponds to the formula $R^1{}_2Al(NR^2{}_2)$ wherein $R^1$ and $R^2$, independently each occurrence are hydrocarbyl, halocarbyl, halohydrocarbyl, silyl, or hydrocarbyl-substituted silyl radicals of from 1 to 20 carbon, silicon or mixtures of carbon and silicon atoms.

3. A catalyst composition according to claim 2 wherein the Group 13 compound is dimethylaluminum-N,N-dimethylamide, dimethylaluminum-N,N-diethylamide, dimethylaluminum-N,N-diisopropylylamide, dimethylaluminum-N,N-diisobutylamide, diethylaluminum-N,N-dimethylamide, diethylaluminum-N,N-diethylamide, diethylaluminum-N,N-diisopropylylamide, diethylaluminum-N,N-diisobutylamide, diisopropylaluminum-N,N-dimethylamide, diisopropylaluminum-N,N-diethylamide, diisopropylaluminum-N,N-diisopropylylamide, diisopropylaluminum-N,N-diisobutylamide, diisobytylaluminum-N,N-dimethylamide, diisobutylaluminum-N,N-diethylamide, diisobutylaluminum-N,N-diisopropylylamide, diisobutylaluminum-N,N-diisobutylamide, dimethylaluminum-N,N-bis(trimethylsilyl)amide, diethylaluminum-N,N-bis(trimethylsilyl)amide, diisobutylaluminum-N,N-bis(trimethylsilyl)amide, diisobutylaluminum-N,N-bis(trimethylsilyl)amide, and derivatives thereof formed by ligand exchange with fluorophenyl substituted borane compounds.

4. A catalyst composition according to claim 1 wherein the molar ratio of metal complex to component b) is from 1:1 to 1:50.

5. A catalyst composition according to claim 1 wherein the activating cocatalyst comprises trispentafluorophenylborane, N-methyl-N,N-dioctadecylammonium tetrakis(pentafluorophenyl)borate, bis-hydrogenated tallowalkyl methylammonium tetrakis(pentafluorophenyl)borate, or the derivative resulting from ligand exchange between trispentafluorophenylborane and component b).

6. A process for polymerization of addition polymerizable monomers or mixtures thereof comprising contacting said monomer or mixture of monomers with a catalyst system comprising the catalyst composition of claim 1 under addition polymerization conditions.

7. The process of claim 6 wherein the addition polymerizable monomer is a $C_{2-20}$ α-olefin or a mixture thereof.

8. The process of claim 7 wherein the molar ratio of metal complex to component b) is from 1:1 to 1:50 .

* * * * *

UNITED STATES PATENT AND TRADEMARK OFFICE
CERTIFICATE OF CORRECTION

PATENT NO. : 6,017,842
DATED : January 25, 2000
INVENTOR(S) : Robert K. Rosen, et. al.

It is certified that error appears in the above-indentified patent and that said Letters Patent is hereby corrected as shown below:

Title page, column 2, Abstract, third line, following "Group 4" delete --metallocene--.

Column 16, claim 1, line 34, "independently" should correctly read --X' independently--.

Column 16, claim 1, line 39, "σbonded" should correctly read --σ-bonded--.

Signed and Sealed this

Twentieth Day of March, 2001

Attest:

NICHOLAS P. GODICI

*Attesting Officer*     *Acting Director of the United States Patent and Trademark Office*